United States Patent [19]

Gold

[11] Patent Number: 5,560,702
[45] Date of Patent: Oct. 1, 1996

[54] VAN REAR LIGHT DISPLAY

[76] Inventor: Peter Gold, 389 Peninsula Blvd., Hempstead, N.Y. 11550

[21] Appl. No.: 566,671

[22] Filed: Dec. 4, 1995

[51] Int. Cl.$^6$ .................................................... B60Q 1/26
[52] U.S. Cl. ............................ 362/80; 362/83.3; 340/471; 340/472
[58] Field of Search .......................... 362/62, 83.3, 249, 362/80; 340/468, 471, 472, 473

[56] References Cited

U.S. PATENT DOCUMENTS

| | | | |
|---|---|---|---|
| 2,853,595 | 9/1958 | Baldwin | 362/80 |
| 2,991,116 | 7/1961 | Andrews | 362/80 |
| 3,633,021 | 1/1972 | Rossi | 362/80 |
| 5,010,319 | 4/1991 | Killinger | 362/80 |
| 5,193,895 | 3/1993 | Naruke et al. | 362/80 |
| 5,510,763 | 4/1996 | Deckard et al. | 340/472 |

*Primary Examiner*—Denise L. Gromada
*Assistant Examiner*—Thomas M. Sember
*Attorney, Agent, or Firm*—Myron Amer, P.C.

[57] ABSTRACT

For a popular dome-shaped industrial van having rear left and right doors, an added pair of tail lights at the top of the van rear edge to which the doors are hinged. Which in the location noted the tail lights are visible to an oncoming motorist when the doors are open through the clearance bounded by the outwardly diverging van rear edges and upper door edges, thus contributing to safer use during loading and unloading of the industrial van.

1 Claim, 1 Drawing Sheet

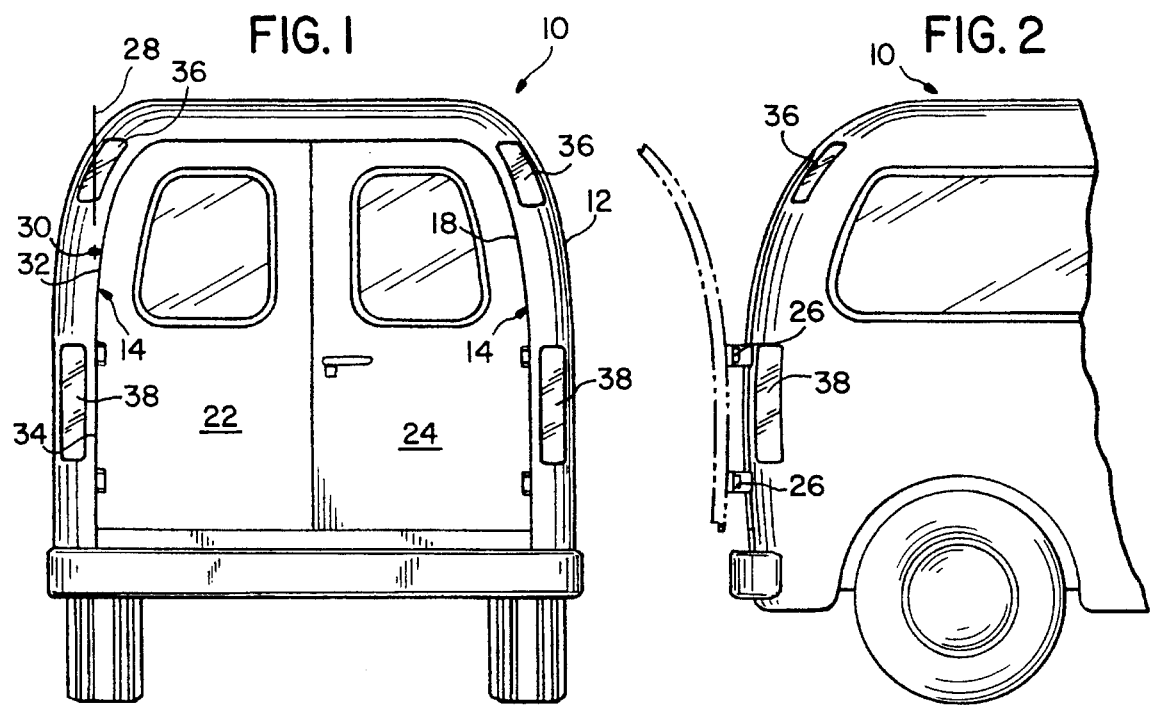
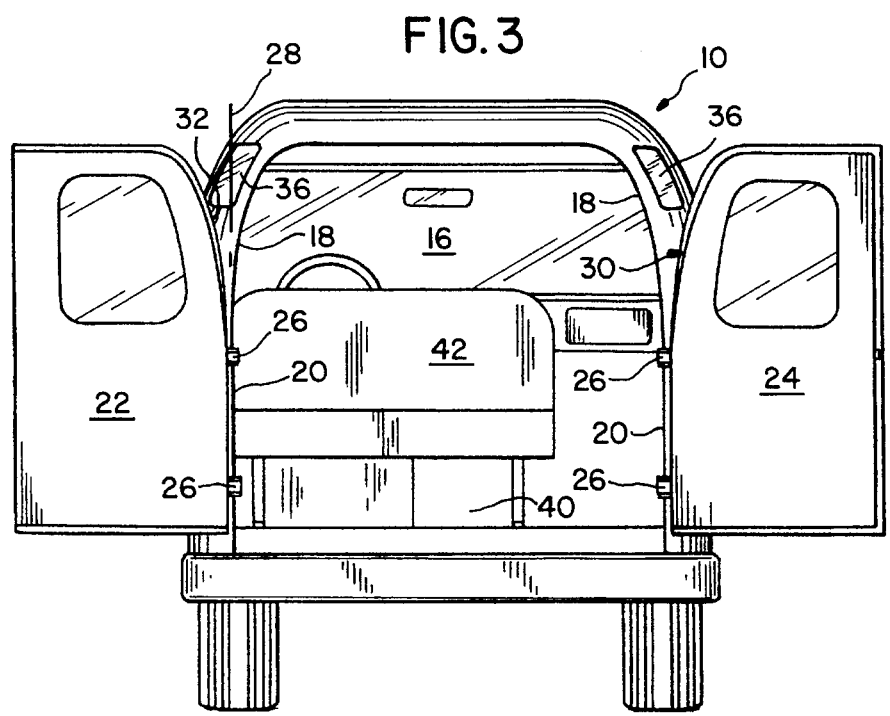

VAN REAR LIGHT DISPLAY

The present invention relates generally to improvements for a van tail or rear light display contributing to safer use of the van, and more particularly to the embodiment of an additional or supplementing light display merely by using to better advantage the current construction of a popular van.

EXAMPLES OF THE PRIOR ART

U.S. Pat. No. 3,582,629 for "Emergency Signal Light for Automobile" issued to John R. Chamberlain on Jun. 1, 1971 is exemplary of many prior art patents which illustrate and describe additional tail or rear lights to signal the presence of a vehicle to an oncoming motorist, the additional light of the '639 patent being located on an automobile trunk lid and assuming its intended display position when the trunk lid is raised incident to obtaining access to the trunk. The utility claimed for the '639 rear light improvement is somewhat lessened by the user's location in front of the trunk and thus between the rear light and an oncoming motorist which necessarily blocks some of the rear light from view.

In U.S. Pat. No. 5,193,895 for "Warning Light" issued to Naoki Naruke et al. on Mar. 16, 1993, there is a more pertinent disclosure in FIG. 11 of a van, as distinguished from a sedan type vehicle, having a light on a bottom edge of an open lid of a known hatchback rear closure, which contributes to safer use but also necessarily results in the user's position blocking out some of the rear light display.

Broadly, it is an object of the present invention to supplement the tail or rear light display of a van of a popular type having a trapezoidal-shaped roof with additional lights signalling its presence to an oncoming motorist, and overcoming the foregoing and other shortcomings of the prior art.

More particularly, it is an object to use to advantage as a site for the additional lights the trapezoidal shape of the van, thus completing the embodiment of the additional lights with minimum expense, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a rear view of a van having rear light display means according to the present invention;

FIG. 2 is a partial side elevational view of the rear of the van of FIG. 1 illustrating in phantom perspective a van rear door in an open condition; and FIG. 3 is a similar rear view of the van of FIG. 1, but illustrating the rear doors thereof in an open condition.

The within illustrated van, generally designated 10, is of the type embodied with a stylish appearance presenting a rear wall means 12 having left and right side edges, each generally designated 14, bounding opposite sides of a cargo compartment access opening 16, of which a top or upper length portion 18 is of a trapezoidal or angular orientation and of which a bottom or lower length portion 20 is of a vertical orientation. Left and right doors 22 and 24 (as seen by an approaching motorist) are mounted in a well understood manner for pivotal movement between closed positions (FIG. 1) and open positions (FIG. 3) respectively closing and opening the cargo-access opening 16, on hinges 26 located on the lower vertical length portions 20, said hinges 26 establishing a rotational axis 28 of a vertical orientation.

Each door 22, 24 has a side edge, generally designated 30, which correspondingly has a top or upper length portion 32 of similar trapezoidal or angular orientation as that of wall means 12 and a bottom or lower length portion 34 also of similar vertical orientation such that, as best understood from FIG. 1, when the doors 22, 24 are closed, the respective top length portions of the wall means edges and door edges 18 and 32, are in a contiguous relation to each other and are located on the same side of the vertical rotation axis 28. However, as best understood from FIG. 3, when each door 22, 24 is urged through a pivotal traverse into its open condition, the wall means edge top length portion 18, of course, being stationary, remains in its FIG. 1 relation to the rotation axis 28, but the door edge top length portion 32 assumes a position, as illustrated, on an opposite side of the rotation axis 28 and is thus in a lateral clearance position from the wall means edge length portion 18.

The displacement of the just noted edges 18 and 32 on opposite sides of the rotation axis 28 is used to advantage in accordance with the present invention by the embodiment in a position adjacent the wall means top edge 18 of a second light display means 36 to supplement a first light means 38 of the van 10, wherein the first light means 38 effective to signal the presence of the van 10 to an approaching motorist when the doors are closed, is not effective in doing so when the doors are open, thus has the second light display means 36 take over or supplement the first light means 38 by providing a visible display to an oncoming or approaching motorist. In that the doors 22, 24 are frequently open, as when cargo is placed into or removed from cargo storage spaces 40 or passengers use the access opening in relation to seating 42, the second light display means 36 is of significant utility by contributing to safer use of the van 10. Safety is also enhanced in that in the closed position of the doors 22 and 24, both the first and second light means 38 and 36 are effective rear light signals to approaching motorists.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A rear light display for a van comprising rear wall means having at least one side edge bounding a rear opening characterized by an upper length portion of an angular orientation and a lower length portion of a vertical orientation, at least one door for opening and closing said rear opening having a side edge when in a closed position of upper and lower length portions of a contiguous relation to said wall means one said side edge, hinge means for interconnecting said one said door to said wall means one said side edge along confronting lower length portions thereof effective to establish a rotational axis of a vertical orientation which is displaced laterally of both said upper length portion edge and upper length portion of said door in said closed position thereof and in said open condition of said door effective to displace said wall means upper length portion edge and said upper length portion of said door on opposite sides of said rotation axis for bounding a clearance therebetween, and a rear light display selectively located on said rear wall means so as to be visible through said clearance to an approaching motorist, whereby during use of said van rear opening as occurs when said door is in an opening condition there is a light signalling the presence of said van to said approaching motorist.

* * * * *